United States Patent [19]

Gagnon

[11] Patent Number: 4,858,358

[45] Date of Patent: Aug. 22, 1989

[54] BADGE AND METHOD OF MAKING SAME

[76] Inventor: Raymond Gagnon, 105, Bellefeuille, St-Calixte (Qué), Canada, H3P 1P1

[21] Appl. No.: 85,309

[22] Filed: Aug. 10, 1987

Related U.S. Application Data

[63] Continuation of Ser. No. 596,503, Apr. 3, 1984, abandoned.

[51] Int. Cl.[4] .......... B32B 31/18

[52] U.S. Cl. .......... 40/616; 40/1.5

[58] Field of Search .......... 40/616, 1.5

[56] References Cited

U.S. PATENT DOCUMENTS

| | | | |
|---|---|---|---|
| 990,426 | 4/1911 | Dewes | 83/139 |
| 1,082,986 | 12/1913 | Wilder | 83/139 |
| 2,603,899 | 7/1952 | Leander | 40/20 |
| 2,975,538 | 3/1961 | Murfin | 40/1.5 |
| 2,988,835 | 6/1981 | Murphy | 40/616 |
| 3,257,747 | 6/1966 | Schimmel | 40/1.5 |
| 3,546,497 | 12/1970 | Oleson | 40/1.5 |
| 3,889,407 | 6/1975 | Elzer | 40/1.5 |
| 3,931,688 | 1/1976 | Owens | 40/1.5 |
| 3,996,679 | 12/1976 | Warneke | 40/1.5 |
| 4,338,737 | 7/1981 | Lehmann | 40/1.5 |
| 4,350,799 | 11/1967 | Japs | 40/1.5 |
| 4,377,050 | 3/1983 | Renholts | 40/616 |

FOREIGN PATENT DOCUMENTS 2282335 3/1976 France .

*Primary Examiner*—Robert P. Swiatek
*Assistant Examiner*—Cary E. Stone
*Attorney, Agent, or Firm*—Steele, Gould & Fried

[57] ABSTRACT

A badge for wearing on one's clothes or on any other surface, made of a body layer of synthetic foam and material of the type having no memory when compressed, the body layer carrying an image on its front face and fastening means at its back face. The body layer has a marginal portion of smaller thickness than that of the central portion of the body layer, with the foam material exposed at the periphery of the body layer.

3 Claims, 2 Drawing Sheets

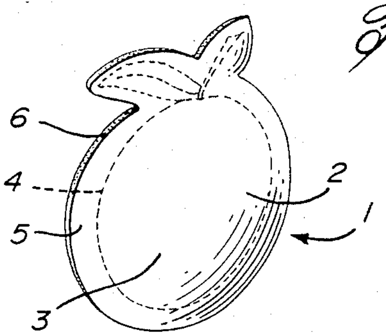
Fig. 1
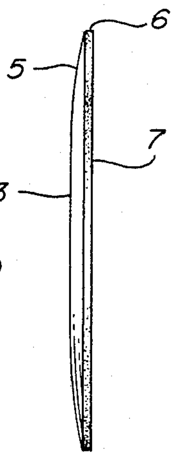
Fig. 2
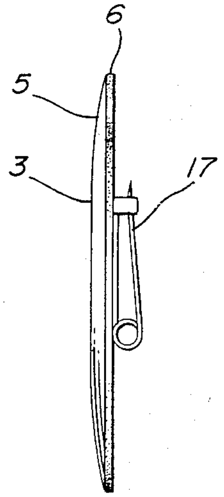
Fig. 3
Fig. 4
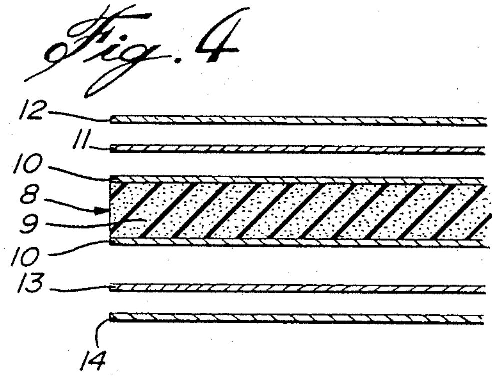
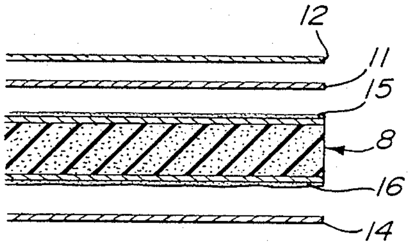
Fig. 5

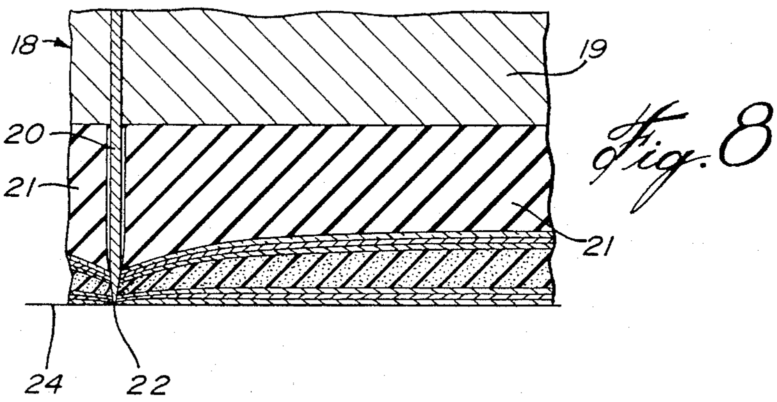
Fig. 8
Fig. 6
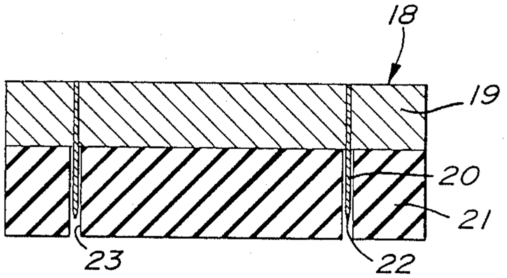
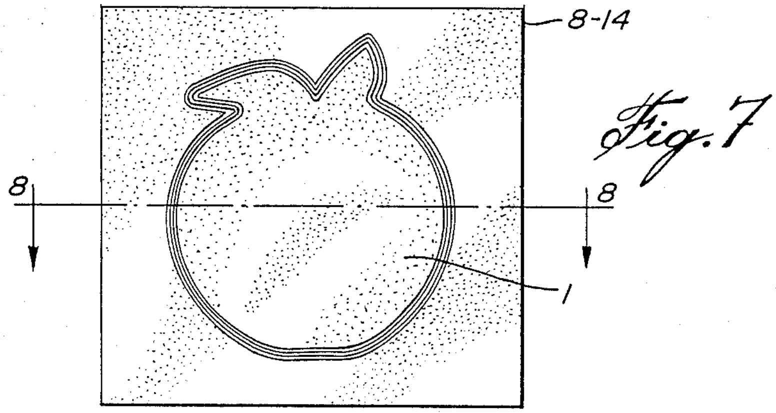
Fig. 7

BADGE AND METHOD OF MAKING SAME

This is a continuation of application Ser. No. 596,503 filed Apr. 3, 1984, now abandoned.

FIELD OF THE INVENTION

The present invention relates to a badge and to a method of making the same.

BACKGROUND OF THE INVENTION

U.S. Pat. No. 4,338,737 dated July 13, 1982 to Roger W. Lehmann describes a badge made of a body layer of foam plastic and covered at its front and back faces with a sheet of plastic material which are heat sealed together at their marginal edges. This construction is relatively expensive, since the foam plastic material has first to be cut out to the desired contour. Then the wall sheets have to be cut out to a slightly greater size and then assembled with the body layer and, finally, the resulting assembly subjected to a heat-sealing operation.

OBJECTS OF THE INVENTION

The general object of the present invention is to provide a badge and a method of making the same, which is much less expensive than in the above-mentioned Patent.

Another object of the invention is to provide a badge which has the appearance of and which imitates, to a certain extent, the standard metal badges with a tapered contour.

Another object of the present invention is to provide a badge of very light weight construction and which will resist wear and tear.

SUMMARY OF THE INVENTION

The badge of the invention comprises a layer of synthetic foam material of the type having no memory when compressed, an image-bearing layer adhering to the front face of said body layer, fastening means carried by the back face of said body layer to attach the body layer to the wearer's clothing, the foam material being exposed all around the peripheral edge of said body layer, the marginal portion of said badge having a smaller thickness than the central portion of said badge. The method of the invention comprises providing a laminate formed of the above-noted layers, positioning said laminate on a flat surface and applying a cutting blade against the front surface of said laminate, which not only cuts out the badge from the laminate but also compresses the laminate material in the area of the cutting blade. Consequently, the resulting badge remains with its marginal portion in permanent compressed condition, due to the fact that the foam material used has no memory and will not come back to its original non-compressed condition.

From the foregoing, it is seen that the badge can be made in one single operation once the various layers of the laminate have been assembled.

BRIEF DESCRIPTION OF THE DRAWINGS

FIG. 1 is a perspective view of an example of the badge in accordance with the invention;

FIG. 2 is a side elevation;

FIG. 3 is a side elevation of a badge with a different type of fastening means;

FIG. 4 is an exploded cross-sectional view showing the various layers composing one embodiment of the laminate used to make the badge in accordance with the invention;

FIG. 5 is a view similar to that of FIG. 4 but showing another embodiment of the laminate;

FIG. 6 is a cross-sectional view of the cutting and compressing die used to make the badge of the invention;

FIG. 7 is a plan view of the laminate with the badge cut out;

FIG. 8 is a cross-sectional view of the laminate, also taken along line 8—8 of FIG. 7 but also showing the compressing and cutting die at the end of its compressing and cutting stroke.

In the drawings, like reference characters indicate like elements throughout.

DETAILED DESCRIPTION OF PREFERRED EMBODIMENTS

The badge 1 of FIGS. 1 and 2 is shown in its completed condition ready to be used. It has at its front face 2 a central area 3 delimited by the dotted line 4 and a marginal protion 5 outside the dotted line. The edge of the badge is shown at 6. The back face 7 of the badge is flat and, as shown in FIG. 2, the marginal portion 5 tapers towards the edge 6, so that the marginal portion 5 has a smaller thickness than that of the central area 3 of the badge 1.

FIG. 4 shows one embodiment of the laminate to make the badge 1. The laminate consists of a body layer 8, which is made of a synthetic foam material, indicated at 9, of the type having no memory when compressed so that, once compressed, it stays in this compressed condition. A typical example of such a foam material is expanded polystyrene, preferably such a foam material sandwiched between two paper layers, indicated at 10. Such a body layer may, for instance, have a thickness of two tenths of an inch. Such a body layer is made by Monsanto Inc. and marketed under the registered trade mark FOME COR. An image-bearing layer 11 is adhered to the front face of the body layer 8 and a transparent film 12 is in turn adhered to the image-bearing layer 11. At the back face of the body layer, a sheet of paper 13 or of plastic, coated on both sides with a pressure adhesive, is adhered to the body layer 8 and a pealable protecting film 14 is adhered to the exposed face of the pressure adhesive to complete the laminate.

FIG. 5 shows an alternative embodiment of the laminate. The same body layer 8 is used, together with the image-bearing layer 11 and the protective transparent film 12 at the front face. The image-bearing paper is glued onto the paper layer 10 of the body layer 8 by means of liquid glue, indicated at 15. In this embodiment, the sheet of double-coated pressure adhesive 13 is replaced by a single layer of pressure adhesive 16 applied in liquid form to the back of the body layer 8. Once the pealable film 14 at the back of the badge is removed, the badge can be adhered to one's clothing by the exposed pressure adhesive of strip 13, or of layer 16.

This exposed pressure adhesive constitutes the fastening means for the badge. However, this fastening means can be replaced by a metal safety clip, of conventional construction, as shown at 17 in FIG. 3. The assembled laminate is cut out to form the badge in a single operation. For this purpose, the cutting and compressing die, shown in cross-section in FIGS. 6 and 8, is used. This die, generally indicated at 18, includes a rigid backing block 19, a cutting blade 20 and a layer of compressible material 21. The cutting blade 20 is fixed to and protrudes from one face of the block 19, having an exposed cutting edge 22. This cutting blade 20 normally extends to the top surface of block 19 and is longitudinally shaped in accordance with the desired final contour of the badge 1 to be made. The layer 21 of compressible material is adhered to block 19 on the same face from which the cutting blade 20 protrudes. The layer 21 may be made of rubber and it extends on the outside as well as on the inside of the closed figure formed by the cutting blade 20, with a suitable slot 23 formed in the layer 21 in which the cutting blade freely extends. In its non-compressed condition, the layer 21 protrudes at its outer face from the cutting edge 22 of blade 20, as shown in FIG. 6.

The above-described laminate of either FIG. 1 or 5 is supported on a flat supporting surface 24, as shown in FIG. 8, and the die 18 is pressed against the laminate. The top face of the laminate is engaged by the compressible layer 21 and is pressed in place while the cutting blade 20 cuts through the laminate in accordance with the desired contour of the badge 1. Due to the pressing action of the cutting blade, the foam core 9 of the body layer 8 is compressed on each side of the blade 20, and since this foam 9 has no memory, it remains in compressed condition, therefore defining the compressed marginal portion 5 of the finished badge 1. After the dye cutting operation, the badge is already in its completed condition, with the foam layer 9 being exposed at the edge 6 of the badge. However, since the badge has a much reduced thickness at its marginal portion, the exposed foam is hardly visible and will not detract from the general appearance of the badge. Obviously, several badges can be cut out simultaneously from a single sheet of laminate, with the images properly spaced at the top face of the laminate, in which case the die would include several cutting blades 20 adapted to register with the respective images.

What I claim is:

1. A method of making a badge having the appearance of metal badges with tapered contours for wearing on a person's clothing comprising the steps of:

making a laminate consisting of a body layer (8) of synthetic foam material (9) having a front face and a back face, an image-bearing layer (11) adhering to said front face, a protecting transparent film (12) covering said image-bearing layer (11), a layer of pressure adhesive (13) carried by said back face and, a peelable protective film (14) covering said layer of pressure adhesive;

providing a cutting and pressuring die (18) including a rigid backing block (19), a cutting blade (20) fixed to and protruding from one face of said backing block, said blade being a cutting edge (22) forming a closed figure and being longitudinally shaped in accordance with the desired contour of the finished badge;

positioning said laminate (8, 11, 13, 14) on a flat support surface (24) with said image-bearing layer (11) topmost, and pressuring said die (18) against said laminate towards said flat support surface (24);

simultaneously compressing the laminate with said blade and cutting the badge from said laminate, characterized in that:

the foam material used to make the laminate is of the type having no memory when compressed; and a layer of compressible material (21) of uniform thickness is adhered to the one face of the block (19) of the die (18) and completely covers said one face of the block which is proximate to within and outside the same said closed figure, said compressible layer (21), when in non-compressed condition, protruding from said cutting edge (22) of said blade, said blade being free in a slot (23) formed through said layer;

whereby said blade while it cuts the laminate to form said badge (1) simultaneously compresses the area (5) of said laminate adjacent said blade on each side of the same, to thereby obtain the finished badge with said foam exposed at the outer edge (6) of said badge and the marginal portion (5) of said badge tapering toward said edge (6) at the front face (2) of said badge (1).

2. The method of claim 1 wherein said body layer has a core of expanded polystyrene.

3. The method of claim 2 wherein said core of expanded polystyrene is sandwiched between two sheets of paper.

* * * * *